(12) United States Patent
Hoshi et al.

(10) Patent No.: US 10,696,199 B2
(45) Date of Patent: Jun. 30, 2020

(54) VEHICLE SEAT (71) Applicant: TS TECH CO., LTD., Saitama (JP)

(72) Inventors: Yuichiro Hoshi, Tochigi (JP); Sachio Kobayashi, Tochigi (JP); Yuma Tanabe, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 70 days.

(21) Appl. No.: 16/009,575

(22) Filed: Jun. 15, 2018

(65) Prior Publication Data
US 2018/0361895 A1 Dec. 20, 2018

(30) Foreign Application Priority Data
Jun. 19, 2017 (JP) ................. 2017-119206

(51) Int. Cl.
B60N 2/56 (2006.01)
B60N 2/58 (2006.01)
H05B 3/34 (2006.01)
A47C 7/74 (2006.01)

(52) U.S. Cl.
CPC ............ B60N 2/5685 (2013.01); A47C 7/748 (2013.01); B60N 2/5816 (2013.01); H05B 3/34 (2013.01)

(58) Field of Classification Search
None
See application file for complete search history.

(56) References Cited

U.S. PATENT DOCUMENTS

| 4,581,522 A * | 4/1986 | Graham | F24D 19/1096 |
| | | | 219/213 |
| 5,351,918 A * | 10/1994 | Giamati | B64D 15/12 |
| | | | 244/134 D |
| 9,302,602 B2 | 4/2016 | Yoshida et al. | |
| 2012/0228903 A1* | 9/2012 | Abe | A47C 7/74 |
| | | | 297/180.12 |
| 2013/0062329 A1* | 3/2013 | Morita | H05B 3/34 |
| | | | 219/204 |
| 2014/0250642 A1* | 9/2014 | Yamanaka | B60N 2/002 |
| | | | 24/455 |
| 2015/0239379 A1 | 8/2015 | Yoshida et al. | |

FOREIGN PATENT DOCUMENTS

| EP | 2684741 | 1/2014 |
| JP | 201436730 | 2/2014 |
| WO | WO2012049827 | 4/2012 |

* cited by examiner

Primary Examiner — David E Allred
(74) Attorney, Agent, or Firm — Dority & Manning, P.A.

(57) ABSTRACT

In a vehicle seat (1), a heater element (40) disposed between the surface of a cushion pad (8) and a skin member (9) includes a pair of main body portions (45-47) and a crossing portion (48, 49) connecting the main body portions to each other, the crossing portion being received in a tuck-in groove (11) formed in the cushion pad and extending through a gap defined between a bottom portion (22) of the tuck-in groove and a tuck-in member (35). The heater element includes a substrate (41) in sheet form, and a heater wire (42) attached to the substrate, and the heater wire in the crossing portion extends in a direction orthogonal to a lengthwise direction of the tuck-in groove in a zigzag pattern, the heater wire including a bent portion (62) of the zigzag pattern located in a bottom region (68) of the tuck-in groove.

19 Claims, 5 Drawing Sheets

VEHICLE SEAT

TECHNICAL FIELD

The present invention relates to a vehicle seat fitted with a heater element.

BACKGROUND ART

It is known in the field of vehicle seats to interpose a heater element in sheet form between a cushion pad and a skin member forming a seat cushion or a seat back for the purpose of heating a prescribed part of the seat. The heater element typically comprises a substrate in sheet form, and a resistive heater wire printed on the substrate. During the assembly process of the vehicle seat, the heater element is typically placed on the surface of the cushion pad which is formed with a tuck-in groove, and a part of the heater element crossing the tuck-in groove is tucked into the tuck-in groove along with the skin member, See JP2014-36730A, for instance.

When the cushion pad is compressed by an occupant seating on the upper surface of the seat cushion, the cushion pad is compressed, and the upper part of the cushion pad adjoining the tuck-in groove is displaced downward. As a result, the heater wire in the part of the heater element crossing the tuck-in groove is bent. An excessive bending of the heater wire is not desirable in terms of the durability of the heater wire. To minimize the bending of the heater element in the tuck-in groove, the heater wire may extend across the tuck-in groove in a wavy pattern or a zigzag pattern. However, it has been found that the corners of the wavy pattern or the zigzag pattern or portions where the extending direction of the heater wire changes are subjected to concentrated stress so that the durability of the heater wire may be impaired after repeated compression and decompression of the cushion pad.

SUMMARY OF THE INVENTION

In view of such a problem of the prior art, a primary object of the present invention is to provide a vehicle seat fitted with a heater element that can improve the durability of the heater element.

To achieve such an object, one aspect of the present invention provides a vehicle seat (1), comprising: a cushion pad (8) provided with a tuck-in groove (11); a wire (20) provided in the cushion pad under or in a lower part of the groove; a skin member (9) covering a surface of the cushion pad; a tuck-in member (35) attached to a back side of the skin member and engaged by the wire, the tuck-in member extending along a length of the tuck-in groove; and a heater element (40) in sheet form provided between the surface of the cushion pad and the skin member, the heater element including a substrate (41) in sheet form and a heater wire (42) provided on the substrate, wherein the heater element includes a pair of main body portions (45-47) and a crossing portion (48, 49) connecting the main body portions to each other, the crossing portion being received in the tuck-in groove and extending through a gap defined between a bottom portion (22) of the tuck-in groove and the tuck-in member, and wherein the heater wire in the crossing portion extends in a direction orthogonal to a lengthwise direction of the tuck-in groove in a zigzag pattern, the heater wire including a bent portion (62) of the zigzag pattern located in a bottom region (68) of the tuck-in groove.

Thereby, stress concentration on the bent portion of the heater wire can be minimized. When the cushion pad is compressed under the pressure of a seat occupant, the part of the cushion pad in the bottom region does not deform so much as the part of the cushion pad adjoining the bottom portion of the tuck-in groove. Therefore, the deformation of the bent portion in the bottom region is relatively small, and stress concentration in this region can be avoided.

Preferably, the tuck-in member extends linearly along the length of the tuck-in groove, and the bottom region is defined as a region ranging from the bottom portion of the tuck-in groove to an upper surface of the tuck-in member.

Alternatively, the tuck-in member extends linearly along the length of the tuck-in groove, and the bottom region is defined as a region ranging from the bottom portion of the tuck-in groove to a lower surface of the tuck-in member.

Typically, the part of the cushion pad located below the tuck-in member deforms considerably less than the upper part of the cushion pad so that the bent portion is prevented from being bent to a significant extent, and the durability of the heater wire can be improved.

In preferred embodiment of the present invention, the heater wire includes a plurality of bent portions in the crossing portion, and all of the bent portions are located in the bottom region.

Thereby, stress concentration in the bent portions can be effectively avoided, and the durability of the heater wire can be maximized.

Preferably, the heater wire includes a pair of bent portions located on respective side wall portions (23) of the tuck-in groove.

By limiting the number of bent portions to two, the durability of the heater wire can be improved without requiring to unduly increase the width of the crossing portion. By limiting the width of the crossing portion, the crossing portion can be received in the tuck-in groove without causing any irregular deformation of the crossing portion.

Preferably, the heater wire in the crossing portion includes a linear portion (61) extending linearly to form an angle larger than 45° and smaller than 90° with respect to a direction orthogonal to the lengthwise direction of the tuck-in groove.

As the heater wire extends obliquely in the crossing portion, the bending stress of the heater wire can be minimized.

Preferably, the crossing portion is narrower in width than the main body portions, and a corner defined by a side edge of the crossing portion and an opposing edge of one of the main body portion is provided with an extension portion (51-53) of the crossing portion, and the linear portion of the heater wire extends obliquely on the extension portion.

Thereby, the linear portion of the heater wire can be given an adequate length without unduly increasing the width of the crossing portion as a whole.

Preferably, the bottom portion of the tuck-in groove is provided with a plurality of protrusions (24) arranged along the length of the tuck-in groove, and the crossing portion is passed through a space created between an adjoining pair of the protrusions.

Thereby, even when the cushion pad adjoining the tuck-in groove is compressed to a significant extent, the crossing portion is allowed to move into the gap defined between the two adjoining protrusions so that the crossing portion is prevented from deforming in an irregular manner.

Preferably, the crossing portion is narrower in width than the main body portions.

Thereby, the crossing portion is allowed to deform in a controlled manner.

Preferably, a folded portion (65) of the crossing portion is formed adjacent to the bottom portion of the tuck-in groove, the folded portion being spaced from the bottom portion.

Thereby, the crossing portion is allowed to deform in a controlled manner.

DESCRIPTION OF THE PREFERRED EMBODIMENT(S)

A preferred embodiment of the present invention is described in the following with reference to the appended drawings.

Figure 1:
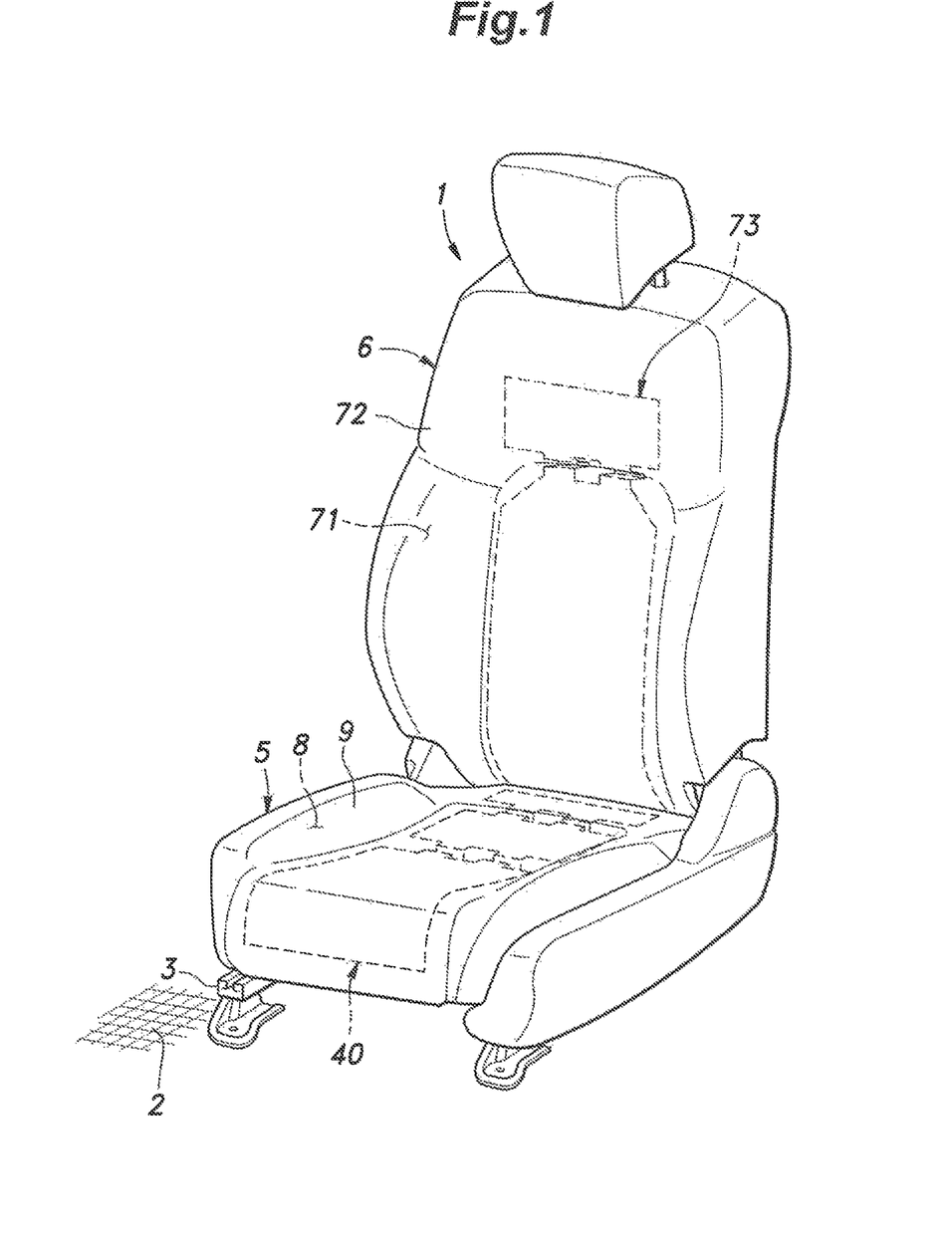
FIG. 1 is a perspective view of a vehicle seat according to a preferred embodiment of the present invention.

As shown in FIG. 1, the seat 1 includes a seat cushion 5 provided on a floor 2 of a vehicle via a slide rail 3, and a seat back 6 pivotally connected to a rear portion of the seat cushion 5, The seat cushion 5 is a main part of the seat 1 for supporting the occupant from below, and the seat back 6 is a backrest part of the seat 1 for supporting the back of the occupant from the rear.

The seat cushion 5 includes a seat cushion frame (not shown in the drawings) consisting of a skeletal frame, a cushion pad 8 supported by the seat cushion frame, and a skin member 9 covering an outer surface of the cushion pad 8.

Figure 2:
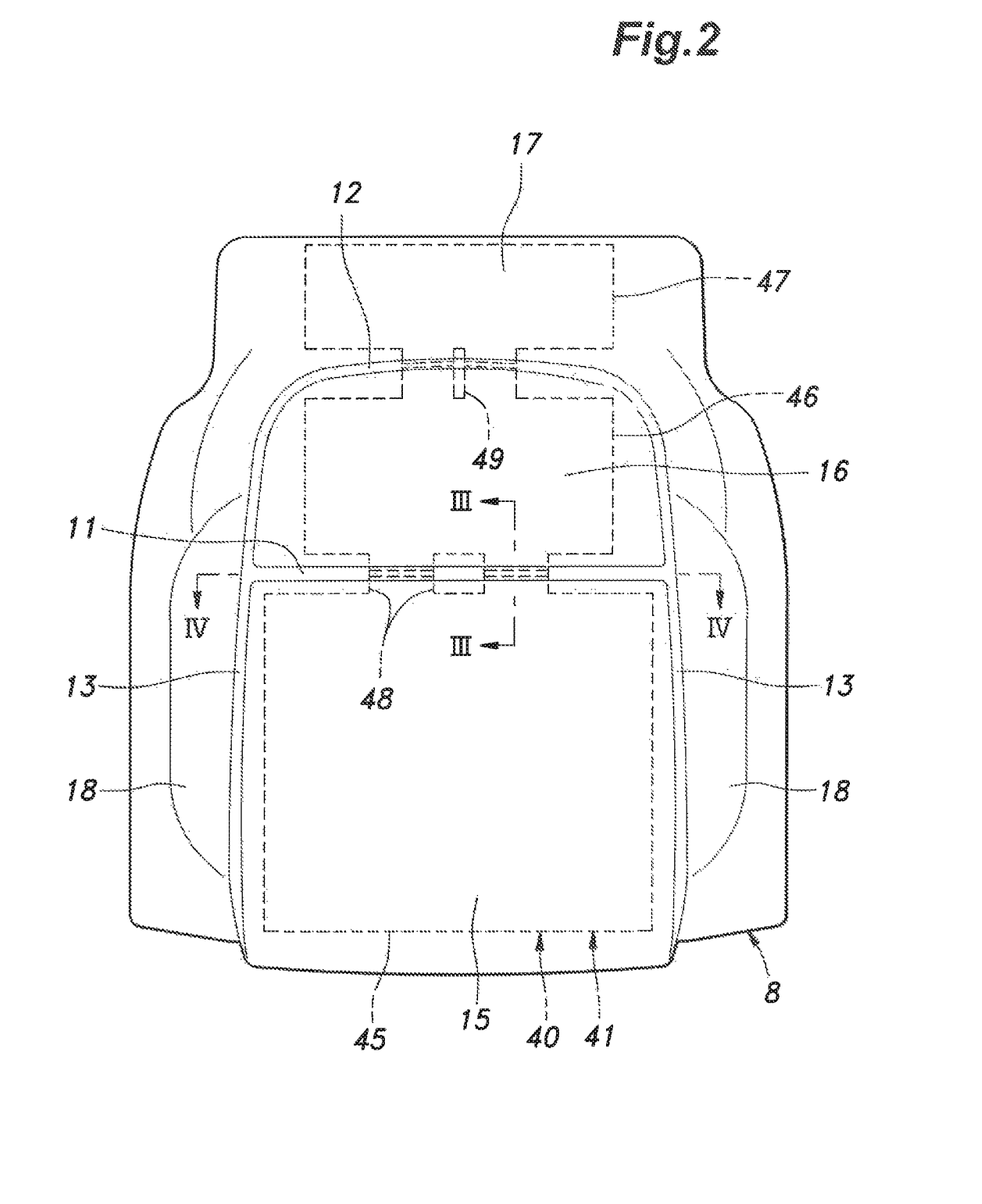
FIG. 2 is a plan view of a seat cushion showing a positional relationship between a cushion pad and a heater element.

The cushion pad 8 is made of a flexible resin material such as foamed urethane. As shown in FIG. 2, a plurality of tuck-in grooves 11-13 are formed on the upper surface of the cushion pad 8. The tuck-in grooves 11-13 each consist of a groove recessed from the surface, and extending in a predetermined direction. The tuck-in grooves 1143 include a first tuck-in groove 11 extending laterally in a middle part of the surface of the cushion pad 8 and terminating at some distance from each side edge of the cushion pad 8, a second tuck-in groove 12 extending laterally in rear end part of the cushion pad 8 and similarly terminating at some distance from each side edge of the cushion pad 8, and a pair of third tuck-in grooves 13 extending in the fore and aft direction and connected to the respective side ends of the first and the second tuck-in grooves 11 and 12.

The lateral ends of the first and the second tuck-in grooves 11 and 12 are connected to the third tuck-in grooves 13 in such a manner that the surface of the cushion pad 8 is separated into a first (front) central part 15, a second (middle) central part 16, a third (rear) central part 17, and a pair of side parts 18 by the first tuck-in groove 11, the second tuck-in groove 12, and the third tuck-in grooves 13. The first central part 15 is defined by the first tuck-in groove 11 and the third tuck-in grooves 13, and the second central part 16 is defined by the first tuck-in groove 11, the second tuck-in groove 12 and the third tuck-in grooves 13. The third central part 17 is defined on the rear side of the second tuck-in groove 12, and the side parts 18 are each defined on an outer side of the corresponding third tuck-in groove 13. The first central part 15, the second central part 16, and the third central part 17 are formed in a substantially planar shape while the side parts 18 each slant upward toward the lateral end thereof.

Figure 3:
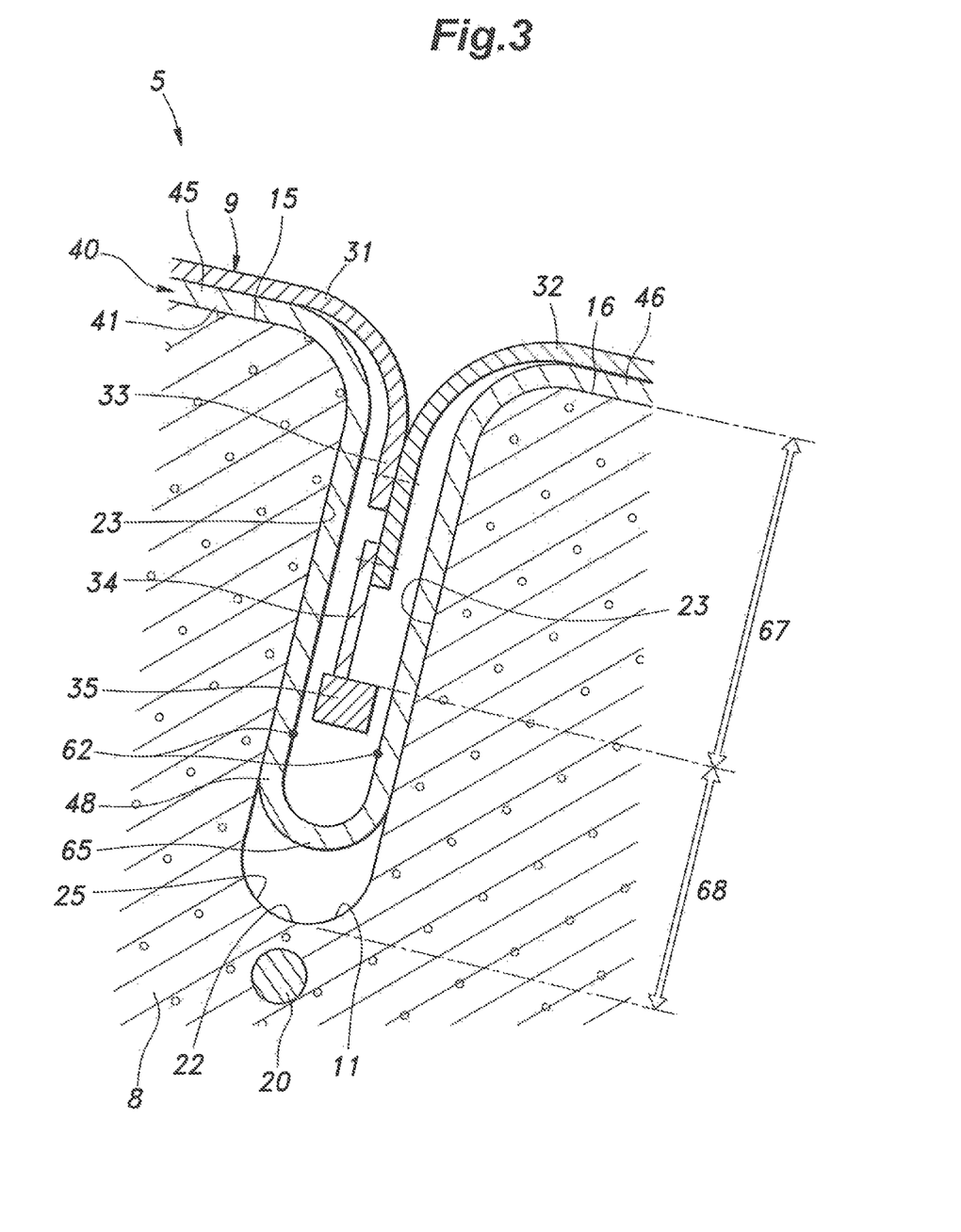
FIG. 3 is a sectional view taken along line III-III of FIG. 2.
Figure 4:
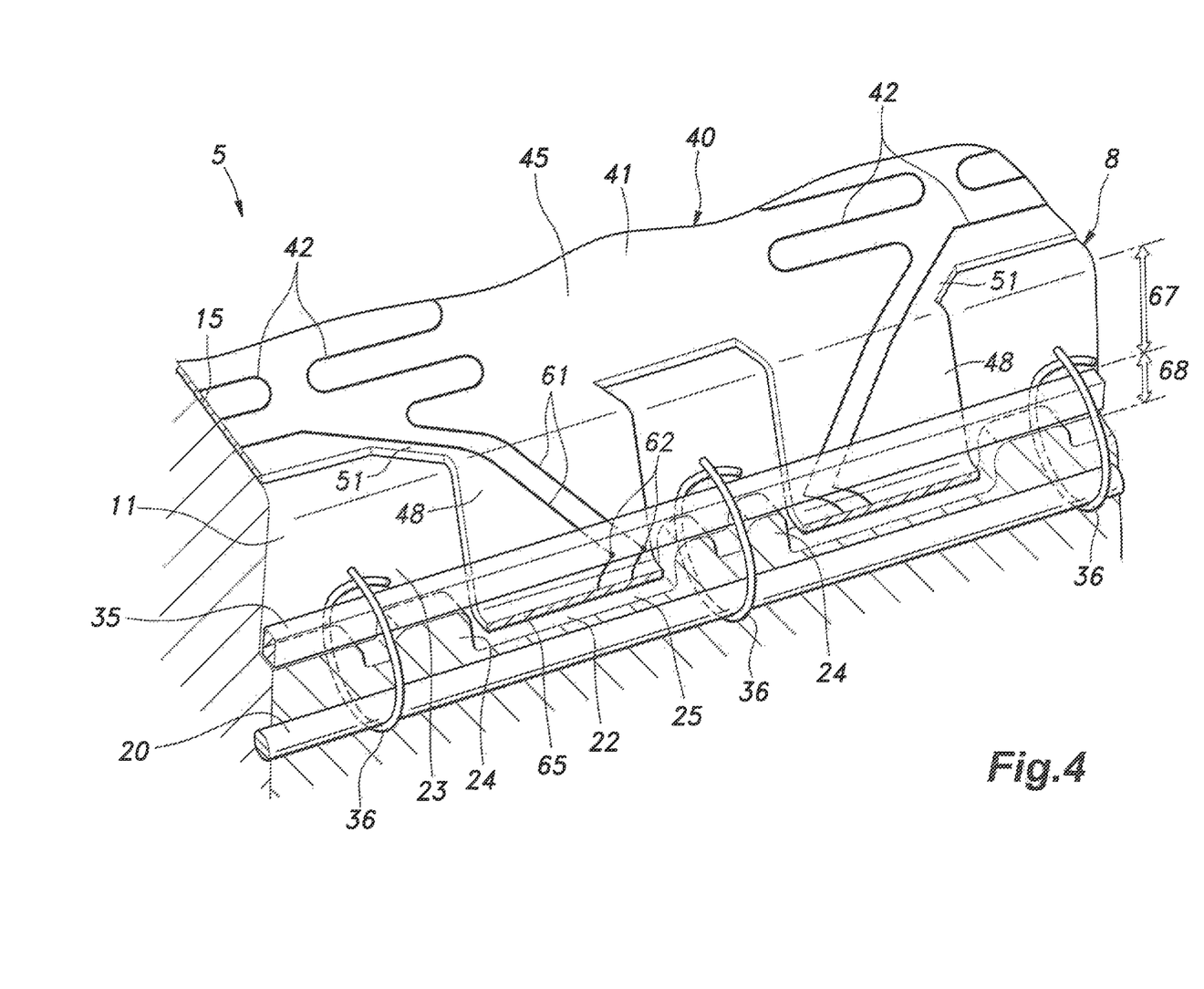
FIG. 4 is a sectional perspective view taken along line IV-IV of FIG. 2.

As shown in FIGS. 3 and 4, a wire 20 consisting of a linear member made of a metal material or a resin material is provided in the cushion pad 8 under or in a lower part of each of the tuck-in grooves 11-13. In each tuck-in groove 11-13, the wire 20 extends along the lengthwise direction thereof. The wire 20 may be disposed in the cushion pad 8 by insert molding of the cushion pad 8 using the wire 20 as an insert in the illustrated embodiment.

The first tuck-in groove 11 has a bottom portion 22 and a pair of side wall portions 23 extending substantially perpendicularly from either side of the bottom portion 22, The bottom portion 22 is provided with a plurality of protrusions 24 protruding toward the opening end side and at a regular interval in the longitudinal direction of the first tuck-in groove 11. In the bottom portion 22, a recess 25 is created between each adjoining pair of the protrusions 24. Each protrusion 24 is connected to the side wall portions 23.

The skin member 9 of the seat cushion 5 and the seat back 6 are formed of a sheet material such as woven fabric, leather and synthetic leather. As shown in FIG. 3, the skin member 9 includes a plurality of sheet sections 31 and 32, and is formed by sewing the edges of the sheet sections 31 and 32 with each other. The edges of the respective sheet sections 31 and 32 are sewn together in an overlapping relationship so that the respective front surfaces thereof are in contact with each other to form a sewn portion 33, Therefore, the sewn portion 33 protrudes to the back surface side with respect to the sheet sections 31 and 32. A pull cloth 34 is stitched to the sewn portion 33.

The pull cloth 34 consists of a band-like member extending along the sewn portion 33, and is sewn to the sewn portion 33 at one side edge. A tuck-in member 35 consisting of a linear member extending along the side edge of the pull cloth 34 is connected to the other side edge of the pull cloth 34. The tuck-in member 35 may also be referred to as a suspender cord. The tuck-in member 35 may extend continuously on the side edge of the pull cloth 34 or may extend intermittently. The tuck-in member 35 is formed of a material having higher rigidity than the pull cloth 34 such as resin and metal. The tuck-in member 35 is preferably connected to the pull cloth 34 by, for example, adhesion or welding. Further, the tuck-in member 35 may be connected to the pull cloth 34 by being inserted into a hole formed in the pull cloth 34. In the present embodiment, the tuck-in member 35 is provided with a substantially square shape, but may also be provided with a circular or other cross sectional shape.

A plurality of engagement members (not shown in the drawings) which may consist of hooks, for example, are provided at appropriate portions of the edge portion of the skin member 9. The skin member 9 is arranged so as to cover the surface of the cushion pad 8. The edge portion of the skin member 9 extends to the back side of the cushion pad 8, and is hooked onto a structural member provided on the seat cushion frame or the seat cushion frame itself by means of the engagement members.

As shown in FIG. 3, when the skin member 9 is placed on the cushion pad 8, the sewn portions 33 and the tuck-in grooves 11-13 are disposed so as to correspond to each other. The sewn portion 33, the pull cloth 34 and the tuck-in member 35 are disposed inside the tuck-in grooves 11-13, and the tuck-in member 35 extends in the lengthwise direction of the tuck-in grooves 11-13. FIG. 4 is a cross sectional perspective view of the seat cushion, in which the skin member 9 and the pull cloth 34 are omitted from illustration. As shown in FIG. 4, the tuck-in member 35 is engaged to the wire 20 by locking members 36. The locking members 36 may each consist of a C-shaped clip hooked onto the tuck-in member 35 and the wire 20, or a ring or a tying band integrally surrounding the tuck-in member 35 and the wire 20. The skin member 9 is thus secured to the surface of the cushion pad 8 by the tuck-in member 35 being engaged by the wire 20.

The tuck-in member 35 is positioned with respect to the tuck-in grooves 11-13 by abutting against the projecting end of the protrusions 24. A space is created between the tuck-in member 35 and the bottom portion 22 of the tuck-in grooves 11-13 by the tuck-in member 35 abutting on the protrusions 24. It can also be said that the space is created by the recesses 25. The tuck-in member 35 is provided with a width which is smaller than the width of the tuck-in grooves 11-13, or the distance between the side wall portions 23. As a result, a gap is created between the tuck-in member 35 and each side wall portion 23.

Figure 5:
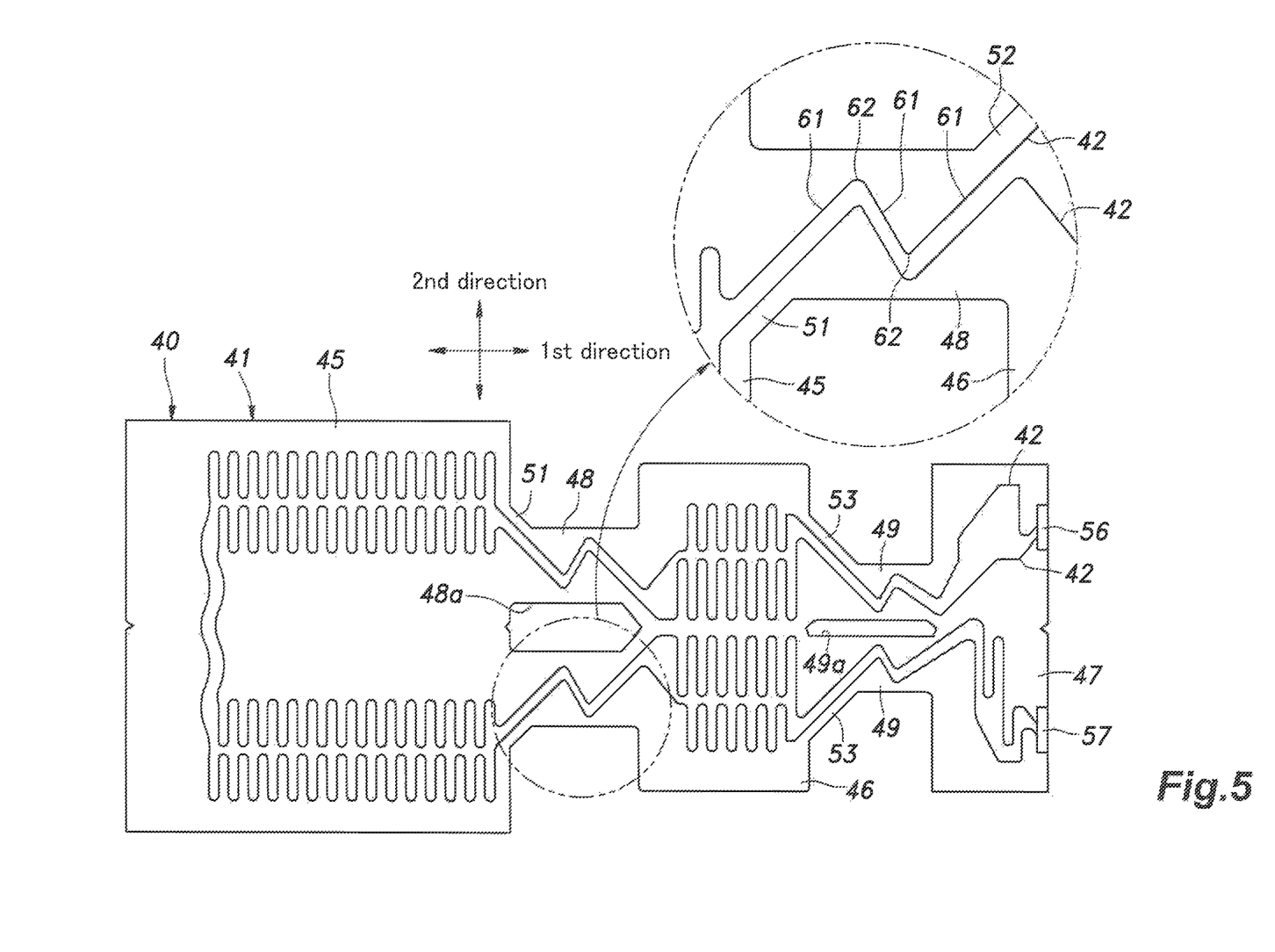
FIG. 5 is a plan view of the heater element.

As shown in FIGS. 3 and 4, a sheet-like heater element 40 (seat heater) is provided between the surface of the cushion pad 8 and the skin member 9. As shown in FIG. 5, the heater element 40 includes a sheet-like substrate 41 and a heater wire 42 attached to the substrate 41.

The substrate 41 is formed of a stretchable sheet member such as a non-woven fabric or a woven fabric. The substrate 41 includes a first main body portion 45, second main body portion 46, and a third main body portion 47 that are connected in series in a prescribed direction. The substrate 41 further includes a first crossing portion 48 connecting the first main body portion 45 to the second main body portion 46, and a second crossing portion 49 connecting the second main body portion 46 to the third main body portion 47. In the illustrated embodiment, each crossing portion 49 consists of two parallel strips. In the illustrated embodiment, the first main body portion 45, the second main body portion 46, the third main body portion 4, the first crossing portion 48, and the second crossing portion 49 consist of a single piece of continuous sheet material.

The first main body portion 45, the second main body 46, and the third main body portion 47 are each formed in a rectangular shape, and have long sides extending in a second direction orthogonal to the first direction. In the present embodiment, the first main body portion 45 is longer than the second main body portion 46 both in the long sides and short sides. The second main body portion 46 has a substantially same length as the third main body portion 47 in the second direction, and is longer than the third main body portion 47 in the first direction.

The first crossing portion 48 and the second crossing portion 49 are formed in a band shape and extend in the first direction. Each crossing portion 48 and 49 may also be considered as a single strip having a central opening 48a and 49a. The first crossing portion 48 is formed narrower than the first main body portion 45 and the second main body portion 46, and the second crossing portion 49 is formed narrower than the second main body portion 46 and the third main body portion 47. A first extension portion 51 is provided at a corner between the first crossing portion 48 and the first main body portion 45 on each outer side of the first crossing portion 48 in such a manner that the edges of the first crossing portion 48 and the first main body portion 45 are joined to each other via slanted edges of the respective first extension portions 51. A second extension portion 52 is provided at a corner defined in the central opening 48a of the first crossing portion 48 between the first crossing portion 48 and the second main body portion 46 on each outer side of the opening 48a in such a manner that the edges of the first crossing portion 48 and the second main body portion 46 are joined to each other via slanted edges of the respective second extension portions 52. Similarly as the first extension portions 51, a third extension portion 53 is provided at a corner between the second main body portion 46 and the second crossing portion 49 on each outer side of the second crossing portion 49 in such a manner that the edges of the second main body portion 46 and the second crossing portion 49 are joined to each other via slanted edges of the respective third extension portions 53, The first to third extension portions 51-53 are thus each provided with a triangular shape.

The heater wire 42 consists of a resistive heater wire that generates heat when electric current is conducted, and is bonded to the surface of the substrate 41 by adhesion or the like. The heater wire 42 extends from a first terminal 56 provided at the rear edge of the third main body portion 47 facing away from the second main body portion 46, and through the third main body portion 47, the second crossing portion 49, the second main body portion 46, the first crossing portion 48, the first main body portion 45, the first crossing portion 48, the second main body portion 46, the second crossing portion. 49, the third main body portion 47 in this order. The heater wire 42 in the third main body portion 47 is connected to a second terminal 57 provided at the rear edge of the third body portion 47. Thus, in the present embodiment, two sections of the heater wire 42 extend in the first direction in parallel to each other, and are connected to the first terminal 56 and the second terminal 57, respectively, at one end, and are connected to each other at the other end. In the illustrated embodiment, the heater wire 42 in fact consists of two heater wires that extend in parallel to each other, but may be treated as a single wire in this disclosure for the convenience of description. The first terminal 56 and the second terminal 57 are connected to a wire harness connected to a power source although not shown in the drawings.

The heater wire 42 extends in the first direction while meandering in the second direction in the first main body portion 45 and the second main body portion 46. In the illustrated embodiment, the heater wire 42 is bent in a hairpin shape so as to include sections that extend substantially in the second direction in parallel to each other.

In the first crossing portion 48 and the second crossing portion 49, the heater wire 42 extends in the first direction while meandering in the second direction. In the present embodiment, the heater wire 42 in the first crossing portion 48 is formed in a zigzag shape (waveform) that includes a plurality (three) of linear portions 61 extending obliquely with respect to the first direction, and a plurality (two) of bent portions 62 provided between the adjacent linear portions 61. Each linear portion 61 forms an angle larger than 45° and smaller than 90° with respect to the first direction. More preferably, each linear portion 61 forms an angle larger than 45° and smaller than 80° with respect to the first direction. The absolute values of the angles of the respective linear portions 61 with respect to the first direction may be equal to each other or may be different from each other.

It is preferable that the bent portions 62 of the heater wire 42 in the first crossing portion 48 and the second crossing portion 49 are each formed as an arcuate section. In the present embodiment, there are two bent portions 62 of the heater wire 42 in each of the first crossing portion 48 and the second crossing portion 49. Each of the bent portions 62 is disposed at the central part of each individual strip of each crossing portion with respect to the first direction. For example, when each crossing portion is divided into three equal parts in the first direction, the bent portions 62 may be disposed in the central part.

The linear portion 61 of the heater wire 42 in the first crossing portion 48 positioned on the side of the first main body portion 45 passes through the first extension portion 51 in extending from the first main body portion 45 to the first crossing portion 48. The linear portion 61 of the heater wire 42 in the first crossing portion 48 positioned on the side of the second main body portion 46 passes through the second extension portion 52 in extending from the first crossing portion 48 to the second main body 46, As a result, the heater wire 42 can linearly extend from the first main body portion 45 and the second main body 46 without forming any bent portion 62 at either end of the first crossing portion 48 in the first direction and without requiring the width of the first crossing portion 48 to be unduly increased.

The side edge of each first extension portion 51 extends in parallel with the linear portion 61 passing through the first extension portion 51. As a result, the area of the first extension portion. 51 required to accommodate the linear portion 61 can be minimized. Similarly, the side edge of each second extension portion 52 extends in parallel with the linear portion 61 passing through the second extension portion 52.

Each linear portion 61 of the heater wire 42 in the second crossing portion 49 located on the side of the second main body portion 46 passes through the third extension portion 53 in extending from the second main body portion 46 to the second crossing portion 49. As a result, the heater wire 42 can extend linearly from the second main body portion 46 without forming any bent portion 62 on the side of the second crossing portion 49 adjoining the second main body portion 46.

As shown in FIG. 2, the first main body portion 45 is arranged on the first central part 15, the second main body portion 46 is arranged on the second central part 16, the third main body portion 47 is arranged on the third central part 17. The heater element 40 is disposed on the surface of the cushion pad 8. The first main body portion 45, the second main body 46 and the third main body portion 47 may be attached to the first central part 15, the second central part 16, and the third central part 17, respectively, by using double-sided tape, for example, in each case. As shown in FIGS. 3 and 4, the first crossing portion 48 is received in the first tuck-in groove 11, and extends across the tuck-in groove 11 by passing through a gap defined between the bottom portion 22 of the first tuck-in groove 11 and the tuck-in member 35. The second crossing portion 49 is similarly received in the second tuck-in groove 12, and extends across the second tuck-in groove 12 by extending through a gap defined between the bottom portion 22 of the second tuck-in groove 12 and the tuck-in member 35.

The first crossing portion 48 passes through the gap defined between the tuck-in member 35 and one of the side wall portions 23 from the open end of the first tuck-in groove 11, and extends toward the bottom portion 22 to be received in the recess 25 or, in other words, to pass through the gap defined between the tuck-in member 35 and the bottom portion 22. The first crossing portion. 48 forms a folded portion 65 under the tuck-in member 35 by being bent by 180° an arcuate shape, and passes through the gap defined between the tuck-in member 35 and the other side wall portion 23 before extending to the open end of the first tuck-in groove 11. As the first crossing portion 48 is not fixedly secured to either side wall portion 23 of the first tuck-in groove 11, the first crossing portion 48 can move along the side wall portions 23 to a certain extent. The two strips of the first crossing portion 48 and the protrusions 24 are arranged in an alternating manner along the lengthwise direction of the first tuck-in groove 11.

When the heater element 40 is placed on the surface of the cushion pad 8, the first direction of the heater element 40 is orthogonal to the extending direction of the first tuck-in groove 11. The heater wire 42 of the first crossing portion 48 extends in a zigzag shape in a direction orthogonal to the extending direction of the first tuck-in groove 11, and extends at an angle to a direction orthogonal to the extending direction of the first tuck-in groove 11, this angle being larger than 45° and smaller than 90°.

In the first tuck-in groove 11, a region ranging from the open end to the surface (edge portion) of the tuck-in member 35 facing the open end is defined as an open end region 67, and a region ranging from the surface (upper surface) of the tuck-in member 35 facing the open end to the bottom portion 22 is defined as a bottom region 68. Each of the bent portions 62 of the heater wire 42 in the first crossing portion 48 is disposed in the bottom region 68, and not in the open end region 67. More preferably, each of the bent portions 62 of the heater wire 42 in the first crossing portion 48 may be disposed closer to the bottom portion 22 than the surface (lower surface) of the tuck-in member 35 facing away from the open end (facing toward the bottom portion 22).

A gap is formed between the folded portion 65 of the first crossing portion 48 and the bottom portion 22. In other words, the folded portion 65 faces the bottom portion 22 via a gap. The width of the tuck-in member 35 is larger than the thickness of the first crossing portion 48, and the distance between the bottom portion 22 and the tuck-in member 35 is larger than the width of the tuck-in member 35. Further, a gap is formed between the folded portion 65 of the first crossing portion 48 and the tuck-in member 35.

The second crossing portion 49 is arranged in the second tuck-in groove 12. The detailed configuration of the second crossing portion 49 in the second tuck-in groove 12 is similar to that of the first crossing portion 48 in the first tuck-in groove 11.

The seat back 6 includes a seat back frame (not shown in the drawings) forming a skeletal frame, a cushion pad 71 supported by the seat back frame, a skin member 72 covering an outer surface of the cushion pad 71, and a heater element 73 provided between the cushion pad 71 and the skin member 72. The configurations of the cushion pad 71, the skin member 72, and the heater element 73 in the seat back 6 are similar to those of the cushion pad 8, the skin member 9, and the heater element 40 in the seat cushion 5.

The features and advantages of the seat 1 configured as described above are described in the following. When the seat cushion 5 receives a load due to seating of an occupant or the like, the cushion pad 8 is compressed in the thicknesswise direction. The first tuck-in groove 11 is also compressively deformed in the depth direction in accordance with the deformation of the cushion pad 8. At this time, the deformation of the first tuck-in groove 11 is more significant in the open end region 67 than in the bottom region 68. This owes to the fact that the bottom region 68 is located farther away from the front side of the cushion pad 8 than the open end region 67, and that the load is supported by the tuck-in member 35 from the outside, so that the load is prevented from being transmitted to the side wall portions 23 defining the bottom portion 68. In the seat 1, because the crossing portions 48 and 49 of the heater element 40 each pass through the corresponding bottom region 68 between the bottom portion 22 and the tuck-in member 35 in the corresponding tuck-in groove 11, 12, and the load is prevented from being applied to the heater element 40, deformation of the crossing portions 48 and 49 is suppressed. As a result, deformation of the heater wire 42 at the crossing portions 48 and 49 is suppressed, and breakage of the heater wire 42 is prevented.

In each of the crossing portions 48 and 49, the bent portions 62 of the heater wire 42 are positioned in the bottom region 68, instead of the open end region 67, stress concentration in the bent portions 62 is minimized.

Since the linear portions 61 of the heater wire 42 in the crossing portions 48 and 49 are inclined at an angle larger than 45° and smaller than 90° with respect to the direction orthogonal to the extending direction of the tuck-in grooves 11 and 12, the deformation of the linear portions 61 of the heater wire 42 owing to the folding deformation of the crossing portions 48 and 49 can be minimized.

Since the bent portions 62 of the heater wire 42 are disposed in the bottom region 68, the distance between the adjoining bent portions 62 of the heater wire 42 or, in other words, the length of the linear portion 61 extending between the adjoining bent portions 62 of the heater wire 42 can be minimized. As a result, the bent portions 62 are confined to the region adjoining the bottom portion 22 so that the bent portions 62 are protected from deformation.

Since a gap is formed between the folded portion 65 of each of the crossing portions 48 and 49 and the bottom portion 22 of the corresponding tuck-in groove 11, 12, even when the surface portion of the cushion pad 8 undergoes a deformation, the crossing portions 48 and 49 can slide into the bottom portions 22 of the tuck-in grooves 11 and 12 so that the deformation of the crossing portions 48 and 49 can be minimized.

Since the folded portions 65 of the crossing portions 48 and 49 are spaced from the tuck-in members 35, even when the surface portion of the cushion pad 8 is deformed, the crossing portions 48 and 49 and the tuck-in members 35 are prevented from contacting each other so that the deformation of the crossing portions 48 and 49 can be minimized.

Since each linear portion 61 of the heater wire 42 extending from the first main body portion 45 extends to the first crossing portion 48 via the corresponding first extension portion 51, the linear portion 61 extending from the first main body portion 45 can be extended to the bottom region 68 without increasing the width of the first crossing portion 48 (or the individual strip thereof), and the associated bent portion 62 is allowed to be located in the bottom region 68. The same is true with the second extension portion 52 and the third extension portion 53.

According to the illustrated embodiment, because each bent portion is located in the bottom region, instead of the open end region, stress concentration on the bent portion can be minimized.

Because the heater wire includes a linear portion extending orthogonally to the lengthwise direction of the tuck-in groove and forming an angle larger than 45° and smaller than 90° with respect to a direction orthogonal to the lengthwise direction of the tuck-in groove, the deformation of the heater wire can be minimized even when the cushion pad adjoining the tuck-in groove is highly compressed.

If the heater wire in the crossing portion includes two bent portions that are positioned in the bottom region, the bent portions can be placed close to the bottom portion without requiring to unduly increase the width of the crossing portion.

By using the tuck-in member that extends linearly along the length of the tuck-in groove, the deformation of the cushion pad in the bottom region can be reduced even further as compared to the open end region.

By providing the protrusions arranged along the length of the tuck-in groove, the crossing portion is allowed to move into the space defined between the protrusions when the cushion pad is compressed under the load of a seat occupant so that the crossing portion is prevented from deforming in an irregular manner.

By defining a gap between the folded portion of the crossing portion and the bottom portion, the crossing portion is allowed to move into the gap when the cushion pad is compressed under the load of a seat occupant so that the crossing portion is prevented from deforming in an irregular manner.

If the distance between the bottom portion of the tuck-in groove and the tuck-in member is larger than the thickness of the crossing portion, the contact between the tuck-in member and the crossing portion and/or the contact between the crossing portion and the bottom portion can be avoided.

By providing a gap between the folded portion of the crossing portion and the tuck-in member, contact between the tuck-in member and the crossing portion can be avoided when the cushion pad is compressed under the load of a seat occupant so that the crossing portion is prevented from deforming in an irregular manner.

By providing the extension portions between the crossing portion and the adjoining main body portion, the linear portions of the heater wire can be extended obliquely without requiring the crossing portion to be increased in width over the entire length thereof.

The side edge of each extension portion may extend in parallel with the heater wire thereon so that the overall area of the extension portion may be minimized.

Although the present invention has been described in terms of a specific embodiment, the present invention is not limited by the illustrated embodiment, but various pars thereof can be modified and substituted without departing from the spirit of the present invention. For example, the first tuck-in groove 11 traversed by the first crossing portion 48 may be configured as a groove extending in the fore and aft direction with respect to the cushion pad 8.

The invention claimed is:

1. A vehicle seat, comprising:
a cushion pad provided with a tuck-in groove;
a wire provided in the cushion pad under or in a lower part of the groove;
a skin member covering a surface of the cushion pad;
a tuck-in member attached to a back side of the skin member and engaged by the wire, the tuck-in member extending along a length of the tuck-in groove; and
a heater element in sheet form provided between the surface of the cushion pad and the skin member, the heater element including a substrate in sheet form and a heater wire provided on the substrate,
wherein the heater element includes a pair of main body portions and a crossing portion connecting the main body portions to each other, the crossing portion being received in the tuck-in groove and extending through a gap defined between a bottom end of the tuck-in groove and the tuck-in member, and
wherein the heater wire in the crossing portion extends in a direction transverse to a lengthwise direction of the tuck-in groove in a zigzag pattern, the heater wire including a plurality of bent portions of the zigzag pattern located in a bottom region of the tuck-in groove, and not in an open end region of the tuck-in groove ranging from an open top end of the tuck-in groove opposite the bottom end to an upper surface of the tuck-in member facing the open top end of the tuck-in groove.

2. The vehicle seat as defined in claim 1, wherein the tuck-in member extends linearly along the length of the tuck-in groove, and the bottom region is defined as a region ranging from the bottom end of the tuck-in groove to the upper surface of the tuck-in member.

3. The vehicle seat as defined in claim 1, wherein the tuck-in member extends linearly along the length of the tuck-in groove, and the bottom region is defined as a region ranging from the bottom end of the tuck-in groove to a lower surface of the tuck-in member.

4. The vehicle seat as defined in claim 1, wherein the heater wire includes a plurality of bent portions in the crossing portion, and all of the bent portions are located in the bottom region.

5. The vehicle seat as defined in claim 4, wherein the heater wire includes a pair of bent portions located on respective side wall portions of the tuck-in groove.

6. The vehicle seat as defined in claim 1, wherein the heater wire in the crossing portion includes a linear portion extending linearly to form an angle larger than 45° and smaller than 90° with respect to a direction orthogonal to the lengthwise direction of the tuck-in groove.

7. The vehicle seat as defined in claim 6, wherein the crossing portion is narrower in width than the main body portions, and a corner defined by a side edge of the crossing portion and an opposing edge of one of the main body portions is provided with an extension portion of the crossing portion, and the linear portion of the heater wire extends obliquely on the extension portion.

8. The vehicle seat as defined in claim 1, wherein the bottom end of the tuck-in groove is provided with a plurality of protrusions arranged along the length of the tuck-in groove, the crossing portion is passed through a space created between an adjacent pair of the protrusions, and the tuck-in member is positioned with respect to the tuck-in grooves by abutting against the projecting end of the protrusions.

9. The vehicle seat as defined in claim 1, wherein the crossing portion is narrower in width than the main body portions.

10. The vehicle seat as defined in claim 1, wherein a folded portion of the crossing portion is formed adjacent to the bottom portion of the tuck-in groove, the folded portion being spaced from the bottom end.

11. A vehicle seat, comprising:
a cushion pad provided with a tuck-in groove;
a wire provided in the cushion pad under or in a lower part of the groove;
a skin member covering a surface of the cushion pad;
a tuck-in member attached to a back side of the skin member and engaged by the wire, the tuck-in member extending along a length of the tuck-in groove; and
a heater element in sheet form provided between the surface of the cushion pad and the skin member, the heater element including a substrate in sheet form and a heater wire provided on the substrate,
wherein the heater element includes a pair of main body portions and a crossing portion connecting the main body portions to each other, the crossing portion being received in the tuck-in groove and extending through a gap defined between a bottom end of the tuck-in groove and the tuck-in member,
wherein the heater wire in the crossing portion extends in a direction transverse to a lengthwise direction of the tuck-in groove in a zigzag pattern, the heater wire including a plurality of bent portions of the zigzag pattern located in a bottom region of the tuck-in groove, and wherein the bottom end of the tuck-in groove is provided with a plurality of protrusions arranged along the length of the tuck-in groove, the crossing portion is passed through a space created between an adjacent pair of the protrusions, and the tuck-in member is positioned with respect to the tuck-in grooves by abutting against the projecting end of the protrusions.

12. The vehicle seat as defined in claim 11, wherein the tuck-in member extends linearly along the length of the tuck-in groove, and the bottom region is defined as a region ranging from the bottom end of the tuck-in groove to the upper surface of the tuck-in member.

13. The vehicle seat as defined in claim 11, wherein the tuck-in member extends linearly along the length of the tuck-in groove, and the bottom region is defined as a region ranging from the bottom end of the tuck-in groove to a lower surface of the tuck-in member.

14. The vehicle seat as defined in claim 11, wherein the heater wire includes a plurality of bent portions in the crossing portion, and all of the bent portions are located in the bottom region.

15. The vehicle seat as defined in claim 14, wherein the heater wire includes a pair of bent portions located on respective side wall portions of the tuck-in groove.

16. The vehicle seat as defined in claim 11, wherein the heater wire in the crossing portion includes a linear portion extending linearly to form an angle larger than 45° and smaller than 90° with respect to a direction orthogonal to the lengthwise direction of the tuck-in groove.

17. The vehicle seat as defined in claim 16, wherein the crossing portion is narrower in width than the main body portions, and a corner defined by a side edge of the crossing portion and an opposing edge of one of the main body portions is provided with an extension portion of the crossing portion, and the linear portion of the heater wire extends obliquely on the extension portion.

18. The vehicle seat as defined in claim 11, wherein the crossing portion is narrower in width than the main body portions.

19. The vehicle seat as defined in claim 11, wherein a folded portion of the crossing portion is formed adjacent to the bottom portion of the tuck-in groove, the folded portion being spaced from the bottom end.

* * * * *